United States Patent
Ogawa et al.

(10) Patent No.: US 6,309,616 B1
(45) Date of Patent: Oct. 30, 2001

(54) METHOD FOR ADSORBING AND REMOVING ETHYLENE AND METHOD FOR PURIFYING AN EXHAUST GAS

(75) Inventors: Hiroshi Ogawa, Shinnanyo; Yukio Ito, Kudamatsu; Masao Nakano, Hikari; Keiji Itabashi, Shinnanyo, all of (JP)

(73) Assignee: Tosoh Corporation, Shinnanyo (JP)

(*) Notice: Subject to any disclaimer, the term of this patent is extended or adjusted under 35 U.S.C. 154(b) by 0 days.

(21) Appl. No.: 09/504,910

(22) Filed: Feb. 16, 2000

Related U.S. Application Data

(62) Division of application No. 09/106,850, filed on Jun. 30, 1998, now Pat. No. 6,042,797.

(30) Foreign Application Priority Data

| Nov. 26, 1977 | (JP) | 9-324279 |
| Jul. 2, 1997 | (JP) | 9-177306 |
| Jul. 2, 1997 | (JP) | 9-177309 |

(51) Int. Cl.⁷ .................. B01J 8/02; B01J 29/06; B01J 21/00; B01J 29/00
(52) U.S. Cl. .................. 423/213.2; 423/213.5
(58) Field of Search .................. 423/213.2, 235, 423/239.1, 239.2, 244.06, 213.5; 502/66, 74

(56) References Cited

U.S. PATENT DOCUMENTS

| 3,331,190 | 7/1967 | Glew et al. ............... 55/63 |
| 4,388,177 | 6/1983 | Bowers et al. |
| 4,622,308 | 11/1986 | Koikeda et al. ........... 502/66 |
| 4,944,273 | 7/1990 | Baresel et al. ........... 123/140 |
| 5,180,402 | 1/1993 | Kubota et al. |
| 5,260,043 | 11/1993 | Li et al. ............... 423/239.2 |
| 5,320,822 | 6/1994 | Ozin et al. |
| 5,382,416 | 1/1995 | Nakano et al. ........... 423/213.2 |
| 5,407,651 | 4/1995 | Kawai ............... 423/213.2 |
| 5,427,753 | 6/1995 | Miura et al. ........... 423/239.2 |
| 5,504,052 | 4/1996 | Rixkalla et al. ........... 502/347 |
| 5,538,697 | 7/1996 | Abe et al. ............... 422/171 |
| 5,741,468 | 4/1998 | Saito et al. ........... 423/239.1 |
| 5,807,528 | 9/1998 | Nakano et al. ........... 423/213.2 |
| 5,908,806 | 6/1999 | Kharas. |

FOREIGN PATENT DOCUMENTS

| 43 40 650 | 6/1994 | (DE). |
| 196 25 849 | 1/1997 | (DE). |
| 0 719 580 | 7/1996 | (EP). |
| 0671459 A1 | 10/1996 | (EP). |
| 2-56247 | 2/1990 | (JP). |
| 02-126936 | 5/1990 | (JP). |
| 2-135126 | 5/1990 | (JP). |
| 5-31359 | 2/1993 | (JP). |
| 5-293380 | 11/1993 | (JP). |
| 6-126165 | 5/1994 | (JP). |
| 6-170234 | 6/1994 | (JP). |
| 6-210163 | 8/1994 | (JP). |
| 6-210165 | 8/1994 | (JP). |
| 6-312132 | 11/1994 | (JP). |
| 07-88364 | 4/1995 | (JP). |
| 07-96178 | 4/1995 | (JP). |
| 07-155613 | 6/1995 | (JP). |
| 07/155611 | 6/1995 | (JP). |
| 07-185326 | 7/1995 | (JP). |
| 08-10566 | 1/1996 | (JP). |
| 08-10613 | 1/1996 | (JP). |
| 8-24655 | 1/1996 | (JP). |
| 8-164338 | 3/1996 | (JP). |
| 8-99033 | 4/1996 | (JP). |
| 9-872 | 1/1997 | (JP). |

OTHER PUBLICATIONS

Max R. Montierth, et al., Fortschr Ber VDI Perhelz, No. 267 BDI, pp. 433 to 459, "Development and Testing of In–Line Zeolite Adsorber System", 1996.

J. L. William, et al., Society of Automotive Engineers, Inc., pp. 57 to 67, "By–Pass Hydrocarbon Absorber System for ULEV", 1996.

Todd H. Ballinger, et al., Society of Automotive Engineers, Inc., pp. 27 to 31, "Hydrocarbon Trap Technology for the Reduction of Cold–Start Hydrocarbon Emissions", 1997.

Patent Abstracts of Japan, vol. 013, No. 408 (C–634), Sep. 8, 1989, JP 01 148341, Jun. 9, 1989.

Patent Abstracts of Japan, vol. 018, No. 575 (C–1268), Nov. 4, 1994, JP 06 210163, Aug. 2, 1994.

Patent Abstracts of Japan, vol. 096, No. 011, Nov. 29, 1996, JP 08 188414, Jul. 23, 1996.

*Primary Examiner*—Steven P. Griffin
*Assistant Examiner*—Cam N. Nguyen
(74) *Attorney, Agent, or Firm*—Oblon, Spivak, McClelland, Maier & Neustadt, P.C.

(57) ABSTRACT

A method for adsorbing and removing ethylene in an exhaust gas, comprises contacting with the gas an adsorbent comprising a zeolite which contains Ag and which has a ferrierite structure with a $SiO_2/Al_2O_3$ molar ratio being at least 15.

1 Claim, No Drawings

METHOD FOR ADSORBING AND REMOVING ETHYLENE AND METHOD FOR PURIFYING AN EXHAUST GAS This is a divisional of application Ser. No. 09/106,850, filed Jun. 30, 1998, now U.S. Pat. No. 6,042,797, issued Mar. 28, 2000.

The present invention relates to an adsorbent for purifying a hydrocarbon contained in a gas, such as the atmosphere or an exhaust gas discharged from an internal combustion engine, a method for adsorbing and removing a hydrocarbon, and a method for purifying an exhaust gas, and it is applicable, for example, to purifying a hydrocarbon, particularly ethylene, contained in an exhaust gas discharged from an internal combustion engine of e.g. an automobile, and to adsorbing and removing ethylene as a matured or aged hormone formed from e.g. the crops.

For purification of an exhaust gas containing hydrocarbons discharged from an internal combustion engine of e.g. an automobile, a method has been practically used in which a three way catalyst is contacted with the exhaust gas. It is known that the exhaust gas-purifying ability of such a three way catalyst is observed at a temperature of at least 300° C. Accordingly, when the exhaust gas temperature is low at the start up of an engine, not only the concentration of hydrocarbons in the exhaust gas is high, but also the three way catalyst has not yet reached the operable temperature, whereby the hydrocarbons will be discharged without being purified.

With respect to purification of hydrocarbons from an exhaust gas at a low temperature, JP-A-2-135126 proposes an exhaust gas-purifying apparatus employing an adsorbent for hydrocarbons, which supports at least one metal on a part of a monolithic substrate having Y-type zeolite and mordenite zeolite coated thereon, for the purpose of adsorbing and purifying hydrocarbons. Further, many other adsorbents for hydrocarbons have been proposed wherein zeolites are used as constituting components. For example, JP-A-6-126165 discloses a molecular sieve having Ag supported thereon; JP-A-6-312132 discloses a zeolite containing Ag, or Ag and at least one metal selected from the group consisting of Co, Ni, Cr, Fe, Mn, Ag, Au, Pt, Pd, Ru, Rh and V; JP-A-8-99033 discloses a zeolite ion-exchanged with Ag and a metal of Group IIIB of the Periodic Table; JP-A-6-210165 discloses an adsorbent consisting of Pd and zeolite; JP-A-6-210163 discloses a zeolite containing Cu, or Cu and at least one metal selected from the group consisting of Co, Ni, Cr, Fe, Mn, Ag, Au, Pt, Pd, Ru, Rh and V; JP-A-6-170234 discloses ZSM-5 zeolite ion-exchanged with at least one metal of Cu and Pd; and JP-A-5-31359 proposes a zeolite with a $SiO_2/Al_2O_3$ molar ratio being at least 40.

Further, it is also known that from an exhaust gas at a low temperature, a hydrocarbon is adsorbed by an adsorbent, and the hydrocarbon which desorbs from the adsorbent as the exhaust gas temperature rises, is utilized to improve the performance for removing nitrogen oxide. The following catalysts have heretofore been proposed as exhaust gas-purifying catalysts comprising a combination of a hydrocarbon adsorbent and a nitrogen oxide-removing catalyst.

JP-A-2-56247 proposes an exhaust gas-purifying catalyst having a first catalyst layer composed mainly of zeolite formed on a substrate and a second catalyst layer composed mainly of a noble metal catalyst having a redox ability formed thereon, as a catalyst whereby a hydrocarbon is selectively adsorbed on the zeolite in a cold state and in an air/fuel ratio rich state, and the hydrocarbon which is desorbed from the zeolite as the exhaust gas temperature rises, and nitrogen oxide, carbon monoxide and a hydrocarbon in the exhaust gas are purified. JP-A-5-293380 proposes an exhaust gas-purifying catalyst which comprises a catalyst having a catalyst component containing at least Pt supported on a substrate made of a porous material and an aluminosilicate having solid acidity and molecular sieve function, as the main components, and a hydrocarbon adsorbent having at least one metal selected from alkali metals and alkaline earth metals supported thereon.

Further, JP-A-8-24655 proposes an exhaust gas-purifying catalyst prepared by mixing a hydrocarbon adsorbent which adsorbs a hydrocarbon in an exhaust gas and desorbs the adsorbed hydrocarbon at a temperature higher than a certain level, with a $NO_x$ catalyst having a catalyst metal supported on a crystalline metal-containing silicate, which purifies nitrogen oxide in an exhaust gas in the presence of a hydrocarbon, or prepared by laminating such a NO. catalyst layer and a hydrocarbon-adsorbent layer; and JP-A-8-164338 proposes an exhaust gas-purifying catalyst, wherein a hydrocarbon adsorbent made of an inorganic crystalline molecular sieve, is supported on a substrate, a first catalyst layer comprising Pd as a catalyst metal is formed on the surface of the hydrocarbon adsorbent particles, a rare earth oxide layer composed mainly of a rare earth oxide, is formed on the first catalyst layer, and a second catalyst layer comprising at least one of Pt and Rh as a catalyst, is formed on the rare earth oxide layer.

Further, JP-A-9-872 proposes an exhaust gas-purifying system wherein an adsorbent having a hydrocarbon-adsorbing ability and a cold ignition catalytic composition comprising a noble metal and a material having electron donative and/or nitrogen dioxide absorptive and desorptive activities, are disposed in an exhaust pipe of an internal combustion engine.

Each of such methods for adsorbing and removing hydrocarbons and methods for purifying exhaust gases employing adsorbents, is one wherein a hydrocarbon contained in an exhaust gas is once adsorbed on an adsorbent at a low temperature during the start up of an engine and kept adsorbed to a temperature at which the exhaust gas-purifying catalyst will operate, and the hydrocarbon desorbed from the adsorbent in a temperature range higher than the temperature, is purified by an exhaust gas-purifying catalyst. Namely, adsorption and removal of a hydrocarbon by an adsorbent will function effectively for the first time when the adsorbent has abilities to selectively adsorb a hydrocarbon at a low temperature and to keep it adsorbed.

In recent years, an attention has been drawn to a problem of environmental pollution due to discharge of hydrocarbons, and it is desired to improve the technology for removing such hydrocarbons. For example, various types of hydrocarbons are present in a mixed state in an exhaust gas discharged from an internal combustion engine of e.g. an automobile, and adsorbents corresponding to the respective types of hydrocarbons, are required. However, in the above-mentioned prior art, a study on the adsorption characteristics of a lower hydrocarbon, particularly ethylene, has been insufficient, and the adsorption characteristics of ethylene have been insufficient by the adsorbents disclosed in the prior art.

In general, when a zeolite is used as an adsorbent, the adsorption characteristics of a hydrocarbon are influenced substantially by the type of the hydrocarbon and the pore structure of the zeolite. With respect to the adsorption characteristics of a hydrocarbon having a small carbon number, it can be said that as the molecular diameter is small, its diffusion and migration into zeolite pores are easy, and adsorption is likewise easy. However, due to the easiness in migration of the hydrocarbon, desorption also tends to be easy, and when purification of an exhaust gas is intended, purification tends to be inadequate, since the hydrocarbon tends to desorp at a temperature lower than the temperature at which the catalyst for purifying the hydrocarbon, represented by the three way catalyst, will operate. Further, in purification of an exhaust gas containing excessive oxygen, the utilization factor of the adsorbed hydrocarbon tends to be low. On the other hand, with respect to the adsorption characteristics of a hydrocarbon having a large carbon number, it can be said that a hydrocarbon having a molecular diameter larger than the pore diameter of the zeolite, can hardly diffuse or migrate into the pores, and the adsorption decreases. Thus, the amount of the hydrocarbon adsorbed decreases, and the hydrocarbon will be discharged as it is i.e. without being adequately purified.

Further, the temperature of an exhaust gas from an internal combustion engine is high and reaches a level of at least 600° C. Accordingly, the adsorbent is required to have high thermal resistance, so that the performance for adsorbing the hydrocarbon will not decrease even when the adsorbent is exposed to such a high temperature exhaust gas. Further, an exhaust gas-purifying system comprising a combination of a hydrocarbon adsorbent and a nitrogen oxide-removing catalyst, is required to be adjusted so that the temperature for desorbing the adsorbed hydrocarbon matches the temperature for operation of the nitrogen oxide-removing catalyst, for effective functioning of the system.

It is an object of the present invention to provide an adsorbent which has a high ability of adsorbing ethylene and has an adsorption performance of keeping the hydrocarbon adsorbed to a temperature at which an exhaust gas-purifying catalyst operates, when used for purifying an exhaust gas, and which has adequate thermal resistance in the adsorption performance, a method for adsorbing and removing a hydrocarbon contained in a gas, by means of the adsorbent, and a method for purifying an exhaust gas by employing the adsorbent of the present invention and a nitrogen oxide-removing catalyst.

Under these circumstances, the present inventors have conducted extensive studies on the adsorption characteristics of a lower hydrocarbon, particularly ethylene and as a result, have found that an adsorbent comprising a zeolite having a ferrierite structure with a $SiO_2/Al_2O_3$ molar ratio being at least 15, exhibits adsorption of a specifically large amount of ethylene and a strong power for holding the adsorbed hydrocarbon, and further shows little decrease in the adsorption characteristics even after exposed to a high temperature i.e. is excellent in thermal resistance, as compared with the conventional hydrocarbon adsorbents. The present invention has been accomplished on the basis of this discovery.

That is, the present invention provides an adsorbent for ethylene, comprising a zeolite which contains Ag and which has a ferrierite structure with a $SiO_2/Al_2O_3$ molar ratio being at least 15.

The present invention also provides a method for adsorbing and removing ethylene in a gas, which comprises contacting such an adsorbent with the gas.

Further, the present invention provides a method for purifying an exhaust gas, which comprises contacting an exhaust gas-purifying catalyst comprising such an adsorbent and a nitrogen oxide-removing catalyst, with the exhaust gas.

Now, the present invention will be described in detail with reference to the preferred embodiments.

It is essential that the adsorbent of the present invention comprising a zeolite having a ferrierite structure (hereinafter referred to as a ferrierite). The ferrierite of the present invention has a composition represented by the formula:

$$xM_{n/2}O\cdot Al_2O_3\cdot ySiO_2\cdot zH_2O$$

wherein n is an atomic valence of cation M, x is a number within a range of from 0 to 2.5, y is a number of at least 15, and z is a number of at least 0, and it is available as a natural product and a synthetic product. Its structure is disclosed, for example, in COLLECTION OF SIMULATED XRD POWDER PATTERNS FOR ZEOLITES, M. M. J. Treacy, J. B. Higgins and R. von Ballmoos, ZEOLITES, vol. 16, p. 456–459 (1996), and it is defined as a structure having an X-ray diffraction pattern as shown in Table 1.

TABLE 1

| Index of plane | Angle of diffraction (2 θ, degrees) | Relative intensity |
|---|---|---|
| 111 | 7.78 | 59 |
| 200 | 9.23 | 100 |
| 020 | 12.53 | 9 |
| 101 | 12.69 | 14 |
| 011 | 13.38 | 8 |
| 310 | 15.23 | 26 |
| 220 | 15.59 | 3 |
| 121 | 17.87 | 6 |
| 400 | 18.53 | 2 |
| 130 | 19.41 | 2 |
| 321 | 22.21 | 26 |
| 031 | 22.30 | 8 |
| 420 | 22.43 | 21 |
| 411 | 22.92 | 15 |
| 330 | 23.47 | 17 |
| 002 | 23.76 | 4 |
| 510 | 24.07 | 7 |
| 112 | 25.04 | 16 |
| 040 | 25.22 | 29 |
| 202 | 25.54 | 36 |
| 501 | 26.13 | 6 |
| 240 | 26.91 | 7 |
| 600 | 27.95 | 1 |
| 140 | 28.32 | 2 |
| 312 | 28.34 | 4 |
| 222 | 28.54 | 2 |
| 521 | 29.07 | 9 |
| 530 | 30.07 | 8 |
| 402 | 30.30 | 2 |
| 132 | 30.86 | 5 |
| 422 | 32.90 | 4 |
| 051 | 33.91 | 4 |
| 350 | 34.72 | 3 |
| 042 | 34.92 | 1 |
| 242 | 36.20 | 1 |
| 602 | 37.00 | 3 |
| 730 | 38.03 | 3 |
| 451 | 38.91 | 2 |
| 442 | 39.81 | 1 |

The $SiO_2/Al_2O_3$ molar ratio of the ferrierite constituting the adsorbent of the present invention is at least 15. If the $SiO_2/Al_2O_3$ molar ratio is less than 15, the heat resistance of the zeolite itself tends to be low, and when the adsorbent is exposed to a high temperature, the adsorption characteristics tend to be poor. The $SiO_2/Al_2O_3$ molar ratio of the ferrierite is preferably from 21 to 1,000, more preferably from 40 to 200.

With respect to a method for producing the ferrierite, there is no particular restriction. For example, it can be prepared by a method wherein an organic template agent is not used, as disclosed, for example, in JP-A-59-73423 and JP-A-60-141617. In such a method, a silica source and an alumina source are dispersed in an alkaline solution, followed by hydrothermal synthesis to obtain the ferrierite. Further, it is possible to produce it also by incorporating an organic template agent such as pyridine, N-methylpyridine hydroxide, piperidine, an alkyl-substituted piperidine or butanediamine to the starting material for the synthesis. The organic template agent is incorporated in an organic template agent/$SiO_2$ molar ratio of from 0.01 to 10, preferably from 0.05 to 5. To obtain a hydrocarbon adsorbent having higher thermal resistance and higher durability, it is preferred to produce it by a method wherein pyridine and a fluorine compound are used, as disclosed in JP-A-8-188414.

As the fluorine compound to be used for the production of the ferrierite, a soluble fluorine compound such as hydrogen fluoride, sodium fluoride, sodium silicondluoride or cryolite may be used. It is incorporated in a fluorine compound/$SiO_2$ molar ratio of from 0.01 to 10, preferably from 0.05 to 5. Pyridine is incorporated in a pyridine/$SiO_2$ molar ratio of from 0.0 to 10, preferably from 0.1 to 5.

Further, as the silica source, sodium silicate, amorphous silica, silica sol, silica gel, kaolinite or diatomaceous earth may be used, and as the alumina source, sodium aluminate, aluminum hydroxide, aluminum chloride, aluminum nitrate or aluminum sulfate, may, for example, be used. A particulate amorphous aluminosilicate uniform phase compound obtainable by reacting an aqueous alkali metal silicate solution and an aluminum-containing aqueous solution simultaneously and continuously, as disclosed in JP-B-63–46007, can be used also as a material suitable for the silica source and the alumina source.

When the ferrierite is produced by adding pyridine and a fluorine compound to the reaction system, it may happen that fluorine and/or the fluorine compound will remain in the ferrierite. Fluorine and/or the fluorine compound may remain, but in order to further improve the thermal resistance and durability, it is preferred to remove such fluorine and/or the fluorine compound. As a method for removing the fluorine and/or the fluorine compound, there may be, for example, be mentioned a method of filtration and washing with a large amount of hot water of 80° C. or a method of washing by means of e.g. dilute hydrochloric acid or an aqueous aluminum chloride solution.

As the ferrierite, a synthetic product or its calcined product may, for example, be used. However, ions such as Na in the ferrierite may be treated with e.g. an ammonium salt or a mineral acid, so that it can be used in a H-type or in an ammonium type. The calcination can be carried out at a temperature of from 300 to 1,200° C.

The adsorbent for ethylene of the present invention is constituted by the above ferrierite which contains Ag. The content of Ag is preferably within a range of from 0.1 to 20 wt %, based on the total amount of the ferrierite and active metal components, in order to obtain the performance of adsorbing ethylene sufficiently. It is more preferably from 0.2 to 10 wt %, still more preferably from 0.2 to 7 wt %.

A method for incorporating Ag is not particularly limited, and a conventional method may suitably be employed. For example, it is possible to employ an ion exchange method, an impregnation supporting method, an evaporation-to-dryness method, a dipping method or a solid phase exchange method. As a salt to be used for incorporating Ag is not particularly limited, a salt such as a nitrate, a sulfate, an acetate, an oxalate or an amine complex salt may, for example, be used.

The adsorbent for ethylene of the present invention may further contain Pd. The content of Pd is not particularly limited, but it is preferably within a range of from 0.01 to 10 wt %, based on the total amount of the ferrierite and active metal components. It is more preferably from 0.05 to 5 wt %, still more preferably from 0.1 to 3 wt %. A method for incorporating Pd is not particularly limited, and the same method and the same salt as described above with respect to Ag, may be employed. Further, either Ag or Pd may be first incorporated to the ferrierite, or they may be incorporated simultaneously.

For the adsorbent of the present invention, not only Ag and Pd, but also other transition metals may be incorporated to the ferrierite. Such transition metals are not particularly limited, and elements of Groups IIIA, IVA, VA, VIA, VIIA, VIII, IB and IIB may be mentioned. These transition metals may be incorporated by means of the same method and the same salt as described above with respect to Ag.

As described above, the adsorbent for ethylene of the present invention can be prepared.

The adsorbent of the present invention may be mixed with a binder such as silica, alumina or clay mineral and used as a molded product. Clay minerals include, for example, kaolin, attapulgite, montmorillonite, bentonite, allophane and sepiolite. Further, the adsorbent of the present invention may be wash-coated on a cordierite or metal honeycomb substrate, for use. Adsorption and removal of ethylene can be carried out by contacting a gas containing ethylene to the adsorbent of the present invention. This gas is not particularly limited. Specifically, it may be a gas containing ethylene, for example, the atmosphere, an exhaust gas, or a gas in a storage chamber of the crops. The adsorbent is effective also in a case where the gas contains not only ethylene but also carbon monoxide, carbon dioxide, hydrogen, oxygen, nitrogen, nitrogen oxide, sulfur oxide, water or hydrocarbons other than ethylene.

The concentration of ethylene in the gas is not particularly limited, but it is preferably from 0.001 to 5 vol %, more preferably from 0.005 to 3 vol %, as calculated as methane. The concentrations of various components other than ethylene are also not particularly limited, and for example, CO=0 to 1 vol %, $CO_2$=0 to 10 vol %, $O_2$=0 to 20 vol %, nitrogen oxide=0 to 1 vol %, sulfur oxide=0 to 0.05 vol %, and $H_2O$=0 to 15 vol %.

The space velocity and the temperature at the time of adsorbing and removing ethylene, are not particularly limited. However, the space velocity is preferably from 100 to 500,000 $hr^{-1}$, and the temperature is preferably from −30 to 250° C.

In the present invention, the reason why the ferrierite containing Ag and having a $SiO_2/Al_2O_3$ molar ratio of at least 15, exhibits high ethylene adsorption characteristics, is not clearly understood, but is considered to be attributable to the pore structure of the ferrierite. Pores of the ferrierite have a structure in which oxygen 10-membered ring pores having a long diameter of 5.5 Å and a short diameter of 4.3 Å and oxygen 8-membered ring pores having a long diameter of 4.8 Å and a short diameter of 3.4 Å, are two-dimensionally connected. On the other hand, it is known that the pore sizes of ZSM-5, zeolite β, etc., are larger than the pore size of the ferrierite. The effective molecular diameter of ethylene is 3.9 Å, whereby diffusion of ethylene into pores of the ferrierite is possible. Further, the molecular diameter of ethylene and the pore size of the ferrierite are close, whereby the interaction between the adsorbed ethylene and the ferrierite is strong. Namely, it is believed that desorption of the adsorbed ethylene tends to be not easy, whereby the holding power tends to be large.

Further, it is believed that by the use of the ferrierite with a $SiO_2/Al_2O_3$ molar ratio being at least 15, the thermal stability of Ag which is believed to be the adsorption site of ethylene, is improved, whereby an adsorbent for ethylene having high thermal resistance, can be obtained.

It is possible to carry out purification of an exhaust gas by contacting an exhaust gas-purifying catalyst comprising the adsorbent for ethylene of the present invention as described above and a nitrogen oxide-removing catalyst, with the exhaust gas.

According to the present invention, the removal activity of nitrogen oxide from an exhaust gas can be increased by utilizing a hydrocarbon such as ethylene which is adsorbed by the adsorbent at a low temperature. Therefore, the nitrogen oxide-removing catalyst of the present invention is capable of removing nitrogen oxide from a gas containing a hydrocarbon and the nitrogen oxide and is preferably operable in a temperature range within which the hydrocarbon adsorbed on the above adsorbent will be desorbed. The adsorbent of the present invention shows a desorption behavior such that desorption of the adsorbed hydrocarbon starts from 200° C., and the desorbing amount becomes maximum in the vicinity of 300° C. Accordingly, it is preferred that the nitrogen oxide-removing catalyst is a catalyst showing its activity at a temperature of at least 200° C. Further, it is preferably a catalyst which shows a nitrogen oxide removing activity within a range of from 200 to 350° C. in view of the desorption behavior of the hydrocarbon, in order for the adsorbed hydrocarbon to be effectively utilized in the nitrogen oxide-removing activity.

The constituting components and the composition of the nitrogen oxide-removing catalyst of the present invention are not particularly limited, but the catalyst is preferably the one showing its activity also against an exhaust gas containing excessive oxygen. For example, as a catalyst capable of removing nitrogen oxide from an exhaust gas, it is possible to employ a nitrogen oxide-removing catalyst, for example, crystalline aluminosilicate or thermal resistant inorganic porous material having a transition metal or active metal, as heretofore proposed.

As the crystalline aluminosilicate, ZSM-5, ZSM-11, mordenite, ferrierite, Y-type zeolite or a zeolite having a zeolite β-structure, may, for example, be used. As the thermal resistant inorganic porous carrier, an oxide such as alumina, silica, titania or zirconia, or a composite oxide such as silica-alumina, silica-titania or silica-zirconia, may, for example, be used.

With respect to the active metal to be incorporated to the catalyst support, there is no particular limitation as to the type or the content of the metal. The type of the metal is preferably Pt, Pd, Ir or Rh, more preferably Pt. A method for incorporating such a metal is not particularly limited, and a conventional method may suitably be employed. For example, it is possible to employ an ion exchange method, an impregnation-supporting method, an evaporation-to-dryness method, a dipping method, a solid phase-exchange method or a physical mixing method. The metal salt to be used for incorporating the metal, is not particularly limited, and a salt such as a nitrate, a sulfate, an acetate, an oxalate or an ammine complex salt, may, for example, be mentioned.

The content of the metal contained in the nitrogen oxide-removing catalyst prepared as described above, is preferably within a range of from 0.1 to 10 wt %, based on the total amount of the active metal and the support components, in order to increase the catalyst activities. It is more preferably from 0.2 to 10 wt %, still more preferably from 0.2 to 5 wt %.

As described above, the nitrogen oxide-removing catalyst of the present invention can be prepared.

The adsorbent for ethylene and the nitrogen oxide-removing catalyst of the present invention can be mixed with a binder such as silica, alumina or clay minerals, followed by molding, whereupon the molded product is contacted with the exhaust gas. The clay minerals include, for example, kaolin, attapulgite, montmorillonite, bentonite, allophane and sepiolite. Further, the adsorbent and the nitrogen oxide-removing catalyst of the present invention may be used as wash-coated on a honeycomb-structured substrate made of cordierite or metal.

Further, the above-mentioned adsorbent and the nitrogen oxide-removing catalyst may preliminarily be subjected to thermal treatment in a reducing atmosphere such as hydrogen, nitrogen or helium or in an oxidizing atmosphere such as air, and then contacted with the exhaust gas.

The exhaust gas-purifying catalyst of the present invention comprises the adsorbent for ethylene and the nitrogen-oxide-removing catalyst, as described above. The two components may be used as uniformly physically mixed or in a form wherein the respective components are separated. Namely, the exhaust gas-purifying catalyst of the present invention has no restriction with respect to the form of the combination, except that when the hydrocarbon, particularly ethylene, adsorbed on the adsorbent, desorbs, it will contact the nitrogen oxide-removing catalyst. For example, in a case where the exhaust gas-purifying catalyst is used in a powder form, the adsorbent for ethylene and the nitrogen oxide-removing catalyst may preliminarily be uniformly physically mixed and then molded into an optional shape, or the respective components may be formed into optional shapes and then mixed or arranged separately. In a case where they are used as wash-coated on a honeycomb substrate, the adsorbent for ethylene and the nitrogen oxide-removing catalyst component may be mixed and uniformly slurried, followed by wash-coating, or the respective components may be formed into separate slurries and then laminated by wash coating to obtain a composite. Otherwise, honeycomb structured products obtained by wash-coating the respective components, may be arranged in a proper combination.

Nitrogen oxide in an exhaust gas can be removed by contacting the exhaust gas to the exhaust gas-purifying catalyst of the present invention. Such an exhaust gas is one containing nitrogen oxide and a hydrocarbon such as ethylene. Further, the exhaust gas-purifying catalyst of the present invention is preferably one having the purifying activity also against an exhaust gas containing excessive oxygen. Here, the exhaust gas containing excessive oxygen is meant for an exhaust gas which contains oxygen in excess of the amount of oxygen required to completely oxidize the hydrocarbons, hydrogen and carbon monoxide contained in the exhaust gas. Such an exhaust gas may, for example, be an exhaust gas discharged from an internal combustion engine such as a diesel engine, particularly an exhaust gas from combustion in a large air/fuel ratio.

Accordingly, the types of hydrocarbons contained in the exhaust gas to be treated in the present invention are not particularly limited. However, in a case where ethylene is contained, the removal activity of nitrogen oxide is substantially improved. In addition, paraffins, olefins, aromatic compounds or their mixtures may be contained. Specifically, as the paraffins and the olefins, hydrocarbons having from 1 to 20 carbon atoms may, for example be mentioned. The aromatic compounds may, for example, be benzene, naphthalene, anthracene or their derivatives. Further, light oil, kerosene or gasoline may, for example, be mentioned.

Further, the treatment is effective also in a case where the exhaust gas to be treated by the present invention contains carbon monoxide, carbon dioxide, hydrogen, nitrogen, sulfur oxide or water.

The concentrations of various component gases contained in the exhaust gas are not particularly limited. Usually, however, the nitrogen oxide is preferably from 50 to 2,000 ppm, the hydrocarbons are preferably from 0.001 to 5 vol %, and oxygen is preferably from 0.1 to 20%. The concentrations of various components other than the above component gases, are also not particularly limited, and carbon monoxide is preferably from 0 to 1 vol %, carbon dioxide is preferably from 0 to 10 vol %, sulfur oxide is preferably from 0 to 0.05 vol %, and water is preferably from 0 to 15 vol %. Further, in a case where the concentration of hydrocarbons in the exhaust gas is low, the above-mentioned suitable hydrocarbon may be added to the exhaust gas.

The space velocity and the temperature of the exhaust gas to be treated are not particularly limited. However, the space velocity (based on the volume) is preferably from 100 to 500,000 $hr^{-1}$, and the temperature is preferably from −30 to 900° C. More preferably, the space velocity is from 2,000 to 200,000 $hr^{-1}$, and the temperature is from −30 to 850° C.

Now, the present invention will be described in further detail with reference to Examples. However, it should be understood that the present invention is by no means restricted to such specific Examples.

EXAMPLE 1

Preparation of Adsorbent 1

40 g of a ferrierite manufactured by TOSOH CORPORATION having a $SiO_2/Al_2O_3$ molar ratio of 17 (tradename: HSZ-720KOA) was added to an aqueous ammonium chloride solution having 18.0 g of $NH_4Cl$ dissolved in 400 g of pure water, and an ion exchange operation was carried out at 60° C. for 20 hours. This ion exchange operation was repeated twice, followed by solid-liquid separation. The product was washed with pure water until Cl ions were no longer detected and then dried at 110° C. for 20 hours to obtain an ammonium-type ferrierite ($NH_4$-FER-1).

20 g of $NH_4$-FER-1 (calculated as anhydrous product) was added to an aqueous silver nitrate solution having 0.62 g of silver nitrate dissolved in 100 g of pure water, followed by evaporation to dryness at 60 under reduced pressure to support Ag. Then, the product was dried at 110° C. for 20 hours to obtain adsorbent 1. The amount of Ag supported in adsorbent 1 was analyzed by an ICP emission analysis and found to be 2 wt %.

EXAMPLE 2

Preparation of Adsorbent 2

Supporting of Ag was carried out under the same conditions as in Example 1 except that silver nitrate used was 1.55 g, to obtain adsorbent 2. The amount of Ag supported in adsorbent 2 was analyzed by an ICP emission analysis and was found to be 5 wt %.

EXAMPLE 3

Preparation of Adsorbent 3

Adsorbent 3 was prepared in the same manner as in Example 1 except that as the ferrierite, a ferrierite having a $SiO_2/Al_2O_3$ molar ratio of 21, synthesized by a hydrothermal synthesis, was used. The amount of Ag in adsorbent 3 was analyzed by an ICP emission analysis and found to be 2 wt %.

EXAMPLE 4

Preparation of Adsorbent 4

8.2 g of aluminum chloride hexahydrate ($AlCl_3.6H_2O$: 98.0 wt %), 6.5 g of sodium hydroxide (NaOH: 99 wt %) sufficient to neutralize HCl formed from aluminum chloride, 40.3 g of sodium fluoride (NaF: 99 wt %) as the fluorine source, and 95.6 ml of pyridine ($C_5H_5N$) were dissolved in 628 ml of pure water to obtain a uniform solution.

To this uniform solution, 81.1 g of white carbon (Nipseal VN-3, tradename, manufactured by Nippon Silica Kogyo K.K., $SiO_2$: 88 wt %) was added to obtain a starting material mixture slurry having the following compositional molar ratios.

$SiO_2/Al_2O_3$=57
$F/SiO_2$=0.8
$C_5H_5N/SiO_2$=1
$H_2O/SiO_2$=30

This mixture was put into an autoclave having a capacity of 1 liter, and a hydrothermal synthesis was carried out at 180° C. for 72 hours with stirring at a rotational speed of 50 rpm. The pH of the zeolite slurry after crystallization, was 10.7. After cooling, the solid content was separated, thoroughly washed with water and then dried overnight at 110° C.

To remove fluorine and/or a fluorine compound, the obtained product was thoroughly washed with pure water of 80° C. As a result of a fluorescent X-ray analysis, fluorine and/or a fluorine compound in the zeolite after washing, was less than the detectable limit (0.1%). The composition of the product after washing was analyzed by an ICP emission analysis and found to be $0.96Na_2O.Al_2O_3.74SiO_2$, as calculated as anhydrous product.

The crystal structure of the product after washing was analyzed by an XRD analysis, whereby an X-ray diffraction pattern equivalent to the one shown in Table 1 was obtained, and thus the product was confirmed to be ferrierite.

The obtained ferrierite type zeolite was calcined at 600° C. for 4 hours in an air stream to remove pyridine. Then, 40 g of the ferrierite was added to an aqueous ammonium chloride solution having 3.36 g of $NH_4Cl$ dissolved in 400 g of pure water, followed by an ion exchange operation at 60° C. for 20 hours. This ion exchange operation was repeated twice, followed by solid-liquid separation. The product was washed with pure water until Cl ions were no longer detected and dried at 110° C. for 20 hours to obtain an ammonium type ferrierite ($NH_4$-FER-2).

20 g of $NH_4$-FER-2 (calculated as anhydrous product) was added to an aqueous silver nitrate solution having 0.62 g of silver nitrate dissolved in 100 g of pure water, followed by evaporation to dryness at 60° C. under reduced pressure to support Ag. Then, the product was dried at 110° C. for 20 hours to obtain adsorbent 4. The amount of Ag supported in adsorbent 4 was analyzed by an ICP emission analysis and was found to be 2 wt %.

EXAMPLE 5

Preparation of Adsorbent 5

Synthesis of a ferrierite was carried out in the same manner as in Example 4 except that the compositional molar ratios of the starting material mixed slurry for the synthesis of the ferrierite were changed as follows:

$SiO_2/Al_2O_3$=35
$F/SiO_2$=0.8
$C_5H_5N/SiO_2$=1
$H_2O/SiO_2$=30

Washing with water, drying and an operation for removing fluorine and a fluorine compound were carried out in the same manner as in Example 4, whereupon the composition of the product was $1.02Na_2O \cdot Al_2O_3 \cdot 48SiO_2$ as calculated as anhydrous product.

The crystal structure of the product after washing was analyzed by an XRD analysis, whereby an X-ray diffraction pattern equivalent to the one shown in Table 1, was obtained, and thus the product was confirmed to be ferrierite.

The obtained ferrierite type zeolite was calcined at 600° C. for 4 hours in an air stream to remove pyridine. Then, 40 g of the ferrierite was added to an aqueous ammonium chloride solution having 3.36 g of $NH_4Cl$ dissolved in 400 g. of pure water, whereupon an ion exchange operation was carried out at 60° C. for 20 hours. This ion exchange operation was repeated twice, followed by solid-liquid separation. The product was washed with pure water until Cl ions were no longer detected and dried at 110° C. for 20 hours to obtain an ammonium type ferrierite ($NH_4$-FER-3).

20 g of $NH_4$-FER-3 (calculated as anhydrous product) was added to an aqueous silver nitrate solution having 0.62 g of silver nitrate dissolved in 100 g of pure water, followed by evaporation to dryness at 60° C. under reduced pressure to support Ag. Then, the product was dried at 110° C. for 20 hours to obtain adsorbent 5. The amount of Ag supported in adsorbent 5 was analyzed by an ICP emission analysis and was found to be 2 wt %.

EXAMPLE 6

Preparation of Adsorbent 6

Synthesis of a ferrierite was carried out in the same manner as in Example 4 except that the compositional molar ratios of the starting material mixture slurry for the synthesis of the ferrierite were changed as follows:

$SiO_2/Al_2O_3=80$
$F/SiO_2=0.8$
$C_5H_5N/SiO_2=1.5$
$H_2O/SiO_2=30$

Washing with water, drying and an operation for removing fluorine and a fluorine compound were carried out in the same manner as in Example 4, whereupon the composition of the product was $1.09Na_2O \cdot Al_2O_3 \cdot 86SiO_2$ as calculated as anhydrous product.

The crystal structure of the product after washing was analyzed by an XRD analysis, whereby an X-ray diffraction pattern equivalent to the one shown in Table 1, was obtained, and thus the product was confirmed to be ferrierite.

The obtained ferrierite type zeolite was calcined at 600° C. for 4 hours in an air stream to remove pyridine. Then, 40 g of the ferrierite was added to an aqueous ammonium chloride solution having 3.36 g of $NH_4Cl$ dissolved in 400 g of pure water, whereupon an ion exchange operation was carried out at 60° C. for 20 hours. This ion exchange operation was repeated twice, followed by solid-liquid separation. The product was washed with pure water until Cl ions were no longer detected and dried at 110° C. for 20 hours to obtain an ammonium type ferrierite ($NH_4$-FER-4).

20 g of $NH_4$-FER-4 (calculated as anhydrous product) was added to an aqueous silver nitrate solution having 0.62 g of silver nitrate dissolved in 100 g of pure water, followed by evaporation to dryness at 60° C. under reduced pressure to support Ag. Then, the product was dried at 110° C. for 20 hours to obtain adsorbent 6. The amount of Ag supported in adsorbent 6 was analyzed by an ICP emission analysis and was found to be 2 wt %.

EXAMPLE 7

Preparation of Adsorbent 7

Synthesis of a ferrierite was carried out in the same manner as in Example 4 except that the compositional molar ratios of the starting material mixed slurry for the synthesis of the ferrierite were changed as follows:

$SiO_2/Al_2O_3=100$
$F/SiO_2=0.8$
$C_5H_5N/SiO_2=1.5$
$H_2O/SiO_2=30$

Washing with water, drying and an operation for removing fluorine and a fluorine compound were carried out in the same manner as in Example 4, whereupon the composition of the product was $1.09Na_2O \cdot Al_2O_3 \cdot 113SiO_2$ as calculated as anhydrous product.

The crystal structure of the product after washing was analyzed by an XRD analysis, whereby an X-ray diffraction pattern equivalent to the one shown in Table 1, was obtained, and thus, the product was confirmed to be ferrierite.

The obtained ferrierite type zeolite was calcined at 600° C. for 4 hours in an air stream to remove pyridine. Then, 40 g of ferrierite was added to an aqueous ammonium chloride solution having 3.36 g of $NH_4Cl$ dissolved in 400 g of pure water, followed by an ion exchange operation at 60° C. for 20 hours. This ion exchange operation was repeated twice, followed by solid-liquid separation. The product was washed with pure water until Cl ions were no longer detected and dried at 110° C. for 20 hours to obtain an ammonium type ferrierite (NH4-FER-5).

20 g of $NH_4$-FER-5 (calculated as anhydrous product) was added to an aqueous silver nitrate solution having 0.62 g of silver nitrate dissolved in 100 g of pure water, followed by evaporation to dryness at 60 under reduced pressure to support Ag. Then, the product was dried at 110° C. for 20 hours to obtain adsorbent 7. The amount of Ag supported in adsorbent 7 was analyzed by an ICP emission analysis and was found to be 2 wt %.

EXAMPLE 8

10 g of $NH_4$-FER-1 (calculated as anhydrous product) obtained in Example 1 was added to an aqueous silver nitrate solution having 0.31 g of silver nitrate dissolved in 100 g of pure water, followed by evaporation to dryness at 60° C. under reduced pressure to support Ag. This Ag-supported ferrierite was added to an aqueous palladium solution having 0.08 g of palladium acetate dissolved in 50 g of acetone, followed by evaporation to dryness at 70° C. to support Pd. Then, the product was dried at 110° C. for 20 hours to obtain adsorbent 7. The amounts of Ag and Pd supported in adsorbent 7 were analyzed by an ICP emission analysis, whereby Ag was 2 wt %, and Pd was 0.4 wt %.

EXAMPLE 9

Adsorbent 9 was prepared in the same manner as in Example 8 except that $NH_4$-FER-2 obtained in Example 4, was used. The amounts of Ag and Pd supported in adsorbent 9 were analyzed by an ICP emission analysis, whereby Ag was 2 wt %, and Pd was 0.4 wt %.

Comparative Example 1

Preparation of Comparative Adsorbent 1

Comparative adsorbent 1 was prepared in the same manner as in Example 1 except that as the ferrierite, a ferrierite having a $SiO_2/Al_2O_3$, molar ratio of 13, synthesized by a hydrothemal analysis, was used. The amount of Ag supported in comparative adsorbent 1 was analyzed by an ICP emission analysis and was found to be 2 wt %.

Comparative Example 2

Preparation of Comparative Adsorbent 2

Comparative adsorbent 2 was prepared in the same manner as in Example 1 except that 40 g of a zeolite having a ZSM-5 structure manufactured by TOSOH CORPORATION and having a $SiO_2/Al_2O_3$ molar ratio of 24 (tradename: HSZ-820NAA) was used. The amount of Ag supported in comparative adsorbent 1 was analyzed by an ICP emission analysis and was found to be 2 wt %.

Comparative Example 3

Preparation of Comparative Adsorbent 3

Comparative adsorbent 3 was prepared in the same manner as in Example 1 except that a zeolite having a ZSM-5 structure manufactured by TOSOH CORPORATION and having a $SiO_2/Al_2O_3$ molar ratio of 72 (tradename: HSZ-860HOA) was used. The amount of Ag supported in comparative adsorbent 3 was analyzed by an ICP emission analysis and was found to be 2 wt %.

Comparative Example 4

Preparation of Comparative Adsorbent 4

Comparative adsorbent 4 was prepared in the same manner as in Example 1, except that a zeolite having a ZSM-5 structure manufactured by TOSOH CORPORATION and having a $SiO_2/Al_2O_3$ molar ratio of 2,100 (tradename: HSZ-890HOA) was used. The amount of Ag supported in comparative adsorbent 4 was analyzed by an ICP emission analysis and was found to be 2 wt %.

Comparative Example 5

Preparation of Comparative Adsorbent 5

Comparative adsorbent 5 was prepared in the same manner as in Example 1 except that a zeolite having a mordenite structure manufactured by TOSOH CORPORATION and having a $SiO_2/Al_2O_3$ molar ratio of 26 (tradename: HSZ-660HOA) was used. The amount of Ag supported in comparative adsorbent 5 was analyzed by an ICP emission analysis and was found to be 2 wt %.

Comparative Example 6

Preparation of Comparative Adsorbent 6

Comparative adsorbent 6 was prepared in the same manner as in Example 1 except that a zeolite having a mordenite structure manufactured by TOSOH CORPORATION and having a $SiO_2/Al_2O_3$ molar ratio of 224 (tradename: HSZ-690HOA) was used. The amount of Ag supported in comparative adsorbent 6 was analyzed by an ICP emission analysis and was found to be 2 wt %.

Comparative Example 7

Preparation of Comparative Adsorbent 7

Comparative adsorbent 7 was prepared in the same manner as in Example 1 except that a zeolite having a L-type structure manufactured by TOSOH CORPORATION and having a $SiO_2/Al_2O_3$ molar ratio of 6 (tradename: HSZ-500KOA) was used. The amount of Ag supported in comparative adsorbent 7 was analyzed by an ICP emission analysis and was found to be 2 wt %.

Comparative Example 8

Preparation of Comparative Adsorbent 8

Comparative adsorbent 8 was prepared in the same manner as in Example 1 except that a y-type zeolite manufactured by TOSOH CORPORATION and having a $SiO_2/Al_2O_3$ molar ratio of 29 (tradename: HSZ-370HUA) was used. The amount of Ag supported in comparative adsorbent 8 was analyzed by an ICP emission analysis and was found to be 2 wt %.

Comparative Example 9

Preparation of Comparative adsorbent 9

Comparative adsorbent 9 was prepared in the same manner as in Example 1 except that a β-type zeolite manufactured by TOSOH CORPORATION and having a $SiO_2/Al_2O_3$ molar ratio of 27 (tradename: HSZ-930NHA) was used. The amount of Ag supported in comparative adsorbent 9 was analyzed by an ICP emission analysis and was found to be 2 wt %.

Comparative Example 10

Preparation of Comparative Adsorbent 10

$NH_4$-FER-1 obtained in Example 1 was used as it is, as comparative adsorbent 10.

Comparative Example 11

Preparation of Comparative Adsorbent 11

20 g of $NH_4$-FER-1 (calculated as anhydrous product) obtained in Example 1 was added to an aqueous copper nitrate solution having 1.52 g of copper nitrate trihydrate dissolved in 100 g of pure water, followed by evaporation to dryness at 60° C. under reduced pressure to support Cu. Then, the product was dried at 110° C. for 20 hours to obtain comparative adsorbent 11. The amount of Cu supported in comparative adsorbent 11 was analyzed by an ICP emission analysis and was found to be 2 wt %.

Comparative Example 12

Preparation of Comparative Adsorbent 12

20 g of $NH_4$-FER-1 (calculated as anhydrous product) obtained in Example 1 was added to an aqueous iron nitrate solution having 2.9 g of iron nitrate nonahydrate dissolved in 100 g of pure water, followed by evaporation to dryness at 60° C. under reduced pressure to support Fe. Then, the product was dried at 110° C. for 20 hours to obtain comparative adsorbent 12. The amount of Fe supported in comparative adsorbent 12 was analyzed by an ICP emission analysis and was found to be 2 wt %.

Comparative Example 13

Preparation of Comparative Adsorbent 13

20 g of $NH_4$-FER-1 (calculated as anhydrous product) obtained in Example 1 was added to an aqueous barium nitrate solution having 0.76 g of barium nitrate dissolved in 100 g of pure water, followed by evaporation to dryness at 60° C. under reduced pressure to support Ba. Then, the product was dried at 110° C. for 20 hours to obtain comparative adsorbent 13. The amount of Ba supported in comparative adsorbent 13 was analyzed by an ICP emission analysis and was found to be 2 wt %.

Comparative Example 14

Preparation of Comparative Adsorbent 14

20 g of $NH_4$-FER-1 (calculated as anhydrous product) obtained in Example 1 was added to an aqueous zinc nitrate solution having 1.82 g of zinc nitrate dissolved in 100 g of pure water, followed by evaporation to dryness at 60° C. under reduced pressure to support Zn. Then, the product was dried at 110° C. for 20 hours to obtain comparative adsorbent 14. The amount of Zn supported in comparative adsorbent 14 was analyzed by an ICP emission analysis and was found to be 2 wt %.

Comparative Example 15

Preparation of Comparative Adsorbent 15

20 g of $NH_4$-FER-1 (calculated as anhydrous product) obtained in Example 1 was added to an aqueous magnesium nitrate solution having 4.22 g of magnesium nitrate dissolved in 100 g of pure water, followed by evaporation to dryness at 60° C. under reduced pressure to support Mg. Then, the product was dried at 110° C. for 20 hours to obtain comparative adsorbent 15. The amount of Mg supported in comparative adsorbent 15 was analyzed by an ICP emission analysis and was found to be 2 wt %.

Comparative Example 16

Preparation of Comparative Adsorbent 16

20 g of $NH_4$-FER-1 (calculated as anhydrous product) obtained in Example 1 was added to an aqueous tungsten solution having 0.57 g of ammonium paratungstate dissolved in 100 g of pure water, followed by evaporation to dryness at 60° C. under reduced pressure to support W. Then, the product was dried at 110° C. for 20 hours to obtain comparative adsorbent 16. The amount of W supported in comparative adsorbent 16 was analyzed by an ICP emission analysis and was found to be 2 wt %.

Comparative Example 17

Preparation of Comparative Adsorbent 17

20 g of $NH_4$-FER-1 (calculated as anhydrous product) obtained in Example 1 was added to an aqueous molybdenum solution having 5.15 g of ammonium molybdate dissolved in 100 g of pure water, followed by evaporation to dryness at 60° C. under reduced pressure to support Mo. Then, the product was dried at 110° C. for 20 hours to obtain comparative adsorbent 17. The amount of Mo supported in comparative adsorbent 17 was analyzed by an ICP emission analysis and was found to be 2 wt %.

Comparative Example 18

Preparation of Comparative Adsorbent 18

20 g of $NH_4$-FER-1 (calculated as anhydrous product) obtained in Example 1 was added to an aqueous hexaammine iridium solution containing 0.4 g of Ir, followed by evaporation to dryness at 60° C. under reduced pressure to support Ir. Then, the product was dried at 110° C. for 20 hours to obtain comparative adsorbent 18. The amount of Ir supported in comparative adsorbent 18 was analyzed by an ICP emission analysis and was found to be 2 wt %.

Comparative Example 19

Preparation of Comparative Adsorbent 19

20 g of $NH_4$-FER-1 (calculated as anhydrous product) obtained in Example 1 was added to an aqueous lanthanum nitrate solution having 1.25 g of lanthanum nitrate hydrate dissolved in 100 g of pure water, followed by evaporation to dryness at 60° C. under reduced pressure to support La. Then, the product was dried at 110° C. for 20 hours to obtain comparative adsorbent 19. The amount of La supported in comparative adsorbent 19 was analyzed by an ICP emission analysis and was found to be 2 wt %.

Comparative Example 20

Preparation of Comparative Adsorbent 20

20 g of $NH_4$-FER-1 (calculated as anhydrous product) obtained in Example 1 was added to an aqueous nickel nitrate solution having 1.98 g of nickel nitrate hexahydrate dissolved in 100 g of pure water, followed by evaporation to dryness at 60° C. under reduced pressure to support Ni. Then, the product was dried at 110° C. for 20 hours to obtain comparative adsorbent 20. The amount of Ni supported in comparative adsorbent 20 was analyzed by an ICP emission analysis and was found to be 2 wt %.

Test on Adsorption and Removal of Ethylene

With respect to adsorbents 1 to 9 and comparative adsorbents 1 to 10, 0.1 g of each was packed into an atmospheric pressure fixed bed flow reactor made of quartz glass and subjected to an experiment for adsorption of ethylene. As pretreatment, while circulating 50 cc/min of air, it was heated to 500° C. at a temperature raising rate of 20° C./min and held at 500° C. for 1 hour. After cooling to room temperature, the air was completely replaced by He gas. Then, a model exhaust gas having a composition as identified in Table 2 was contacted to the adsorbent for 1 hour at a gas flow rate of 100 cc/min. The space velocity (based on the volume) at that time was 30,000 $hr^{-1}$. After confirming that adsorption of ethylene in the model exhaust gas on the adsorbent reached saturation, He gas was again introduced to the adsorbent to completely remove ethylene remaining in the gas phase. Then, while flowing He gas at a rate of 50 cc/min and raising the temperature of the adsorbent at a rate of 10° C./min, the hydrocarbon desorbing from the adsorbent was quantitatively analyzed continuously by a gas chromatograph equipped with a flame ionization detector (FID), and the adsorption characteristics of ethylene were evaluated. Table 3 shows the amount of ethylene adsorbed and the adsorption characteristics at the desorption peak temperature.

TABLE 2

| Ethylene | 5000 ppmC (calculated as methane) |
| $H_2O$ | 3 vol % |
| $N_2$ | Balance |

TABLE 3

| Adsorbent | Amount of ethylene adsorbed [mol/g (weight of adsorbent)] | Desorbing temperature (° C.) |
| --- | --- | --- |
| Adsorbent 1 | $4.82 \times 10^{-5}$ | 330 |
| Adsorbent 2 | $5.90 \times 10^{-5}$ | 325 |
| Adsorbent 3 | $6.52 \times 10^{-5}$ | 340 |
| Adsorbent 4 | $10.9 \times 10^{-5}$ | 340 |
| Adsorbent 5 | $10.6 \times 10^{-5}$ | 340 |
| Adsorbent 6 | $9.73 \times 10^{-5}$ | 345 |
| Adsorbent 7 | $10.8 \times 10^{-5}$ | 330 |
| Adsorbent 8 | $15.1 \times 10^{-5}$ | 340 |
| Adsorbent 9 | $18.8 \times 10^{-5}$ | 330 |

TABLE 3-continued

| Adsorbent | Amount of ethylene adsorbed [mol/g (weight of adsorbent)] | Desorbing temperature (° C.) |
|---|---|---|
| Comparative adsorbent 1 | $4.11 \times 10^{-5}$ | 280 |
| Comparative adsorbent 2 | $2.31 \times 10^{-5}$ | 255 |
| Comparative adsorbent 3 | $3.87 \times 10^{-5}$ | 305 |
| Comparative adsorbent 4 | $1.58 \times 10^{-5}$ | 190 |
| Comparative adsorbent 5 | $3.62 \times 10^{-5}$ | 270 |
| Comparative adsorbent 6 | $2.71 \times 10^{-5}$ | 205 |
| Comparative adsorbent 7 | $3.47 \times 10^{-5}$ | 185 |
| Comparative adsorbent 8 | $1.72 \times 10^{-5}$ | 205 |
| Comparative adsorbent 9 | $2.05 \times 10^{-5}$ | 195 |
| Comparative adsorbent 10 | $0.12 \times 10^{-5}$ | 140 |

Test on Durability of Adsorbents

Each of adsorbents 1 to 9 and comparative adsorbents 1 to 20, was press-molded and then pulverized to adjust the particle size to from 12 to 20 mesh. 3 cc of each adsorbent having the particle size thus adjusted, was packed into an atmospheric pressure fixed bed flow reactor made of quartz glass and subjected to a durability test. In the durability test, the adsorbent was treated at 850° C. for 5 hours while circulating to the adsorbent a mixed gas having $H_2O$ incorporated to air gas in an amount of 10 vol %, at a flow rate of 300 cc/min. The adsorbent subjected to such durability treatment was subjected to evaluation of the adsorption characteristics of ethylene by the same pretreatment and evaluation conditions as in "Test on adsorption and removal of ethylene". The adsorption characteristics of ethylene after the durability test are shown in Table 4.

TABLE 4

| Adsorbent | Amount of ethylene adsorbed [mol/g (weight of adsorbent)] | Desorbing temperature (° C.) |
|---|---|---|
| Adsorbent 1 | $6.33 \times 10^{-5}$ | 325 |
| Adsorbent 2 | $6.05 \times 10^{-5}$ | 325 |
| Adsorbent 3 | $6.75 \times 10^{-5}$ | 320 |
| Adsorbent 4 | $11.0 \times 10^{-5}$ | 335 |
| Adsorbent 5 | $10.3 \times 10^{-5}$ | 330 |
| Adsorbent 6 | $13.8 \times 10^{-5}$ | 340 |
| Adsorbent 7 | $12.6 \times 10^{-5}$ | 340 |
| Adsorbent 8 | $19.0 \times 10^{-5}$ | 335 |
| Adsorbent 9 | $28.1 \times 10^{-5}$ | 330 |
| Comparative adsorbent 1 | $4.13 \times 10^{-5}$ | 280 |
| Comparative adsorbent 2 | $1.64 \times 10^{-5}$ | 260 |
| Comparative adsorbent 3 | $2.35 \times 10^{-5}$ | 295 |
| Comparative adsorbent 4 | $0.46 \times 10^{-5}$ | 275 |
| Comparative adsorbent 5 | $1.85 \times 10^{-5}$ | 270 |
| Comparative adsorbent 6 | $1.50 \times 10^{-5}$ | 220 |
| Comparative adsorbent 7 | $0.19 \times 10^{-5}$ | 200 |
| Comparative adsorbent 8 | $0.29 \times 10^{-5}$ | 500 |
| Comparative adsorbent 9 | $0.09 \times 10^{-5}$ | 185 |
| Comparative adsorbent 10 | $0.08 \times 10^{-5}$ | 100 |
| Comparative adsorbent 11 | $0.05 \times 10^{-5}$ | 120 |
| Comparative adsorbent 12 | $0.01 \times 10^{-5}$ | 90 |
| Comparative adsorbent 13 | $0.10 \times 10^{-5}$ | 90 |
| Comparative adsorbent 14 | $0.10 \times 10^{-5}$ | 90 |
| Comparative adsorbent 15 | $0.14 \times 10^{-5}$ | 90 |
| Comparative adsorbent 16 | $0.10 \times 10^{-5}$ | 90 |
| Comparative adsorbent 17 | $0.02 \times 10^{-5}$ | 90 |
| Comparative adsorbent 18 | $0.01 \times 10^{-5}$ | 100 |
| Comparative adsorbent 19 | $0.20 \times 10^{-5}$ | 90 |
| Comparative adsorbent 20 | $0.06 \times 10^{-5}$ | 90 |

As is apparent from Tables 3 and 4, the adsorbents of the present invention are capable of adsorbing large amounts of ethylene, and they are superior in the adsorption characteristics to adsorbents heretofore proposed. Further, with the adsorbents of the present invention, no decrease was observed in the amount adsorbed by the durability treatment, thus indicating that the performance for adsorption and removal of ethylene can be maintained even after the adsorbents are exposed to high temperatures.

EXAMPLE 10

Preparation of Exhaust Gas-purifying Catalyst 1

40 g of mordenite manufactured by TOSOH CORPORATION (tradename: HSZ-690HOA) and having a $SiO_2/Al_2O_3$ molar ratio of 224, was added to a tetraammine dichloroplatinum aqueous solution having 1.23 g of $Pt(NH_3)_4Cl_2 \cdot H_2O$ dissolved in 400 g of pure water, and a suitable amount of 5% aqueous ammonia was immediately dropwise added thereto to adjust the pH of the slurry to 7. This slurry was subjected to an ion exchange operation at 30° C. for 2 hours with stirring. After the ion exchanging, solid-liquid separation was carried out, and the product was washed with pure water until Cl ions were no longer detected and then dried at 110° C. for 20 hours. Then, the product was calcined in air at 500° C. for 1 hour to obtain nitrogen oxide-removing catalyst 1. Nitrogen oxide-removing catalyst 1 was analyzed by an ICP emission analysis, whereby the amount of Pt supported, was 1.7 wt %.

5 g of adsorbent 1 which was calcined in air at 500° C. for 1 hour, and 5 g of nitrogen oxide-removing catalyst 1 were thoroughly physically mixed in a mortar and press-molded under a pressure of 400 kg/cm². The press-molded product was pulverized to adjust the particle size to from 12 to 20 mesh to obtain exhaust gas-purifying catalyst 1.

EXAMPLE 11

Preparation of Exhaust Gas-purifying Catalyst 2

10 g of adsorbent 4 which was calcined in air at 500° C. for 1 hour, and 10 g of nitrogen oxide-removing catalyst 1 were thoroughly physically mixed in a mortar and press-molded under a pressure of 400 kg/cm². The press-molded product was pulverized to adjust the particle size to from 12 to 20 mesh to obtain exhaust gas-purifying catalyst 2.

EXAMPLE 12

Preparation of Exhaust Gas-purifying Catalyst 3

Adsorbent 4 calcined in air at 500° C. for 1 hour, and nitrogen oxide-removing catalyst 1 were, respectively, press-molded under a pressure of 400 kg/cm². The respective press-molded products were pulverized to adjust the particle sizes to from 12 to 20 mesh. Then, 2 g of the respective particle size-adjusted products were mixed to obtain exhaust gas-purifying catalyst 3.

EXAMPLE 13

Preparation of Exhaust Gas-purifying Catalyst 4

Using 1 cc of the particle size-adjusted product of adsorbent 4 and 1 cc of the particle size-adjusted product of nitrogen oxide-removing catalyst 1, having the particle sizes adjusted in the same manner as in Example 12, adsorbent 4 was disposed at an upper stream of the model gas of the catalytic activity test, and nitrogen oxide-removing catalyst 1 was disposed downstream thereof, and they were subjected to the catalytic activity test as exhaust gas-purifying catalyst 4.

EXAMPLE 14

Preparation of Exhaust Gas-purifying Catalyst 5

40 g of γ-alumina manufactured by Shokubai Kasei K.K. (tradename: ACP-1) was added to a tetraammine dichloroplatinum aqueous solution having 1.23 g of $Pt(NH_3)_4Cl_2 \cdot H_2O$ dissolved in 400 g of pure water, and water was removed under reduced pressure at 60° C. by means of a rotary evaporator, followed by drying at 100° C. for 20 hours. Then, the product was calcined in air at 500° C. for 1 hour to obtain nitrogen oxide-removing catalyst 2. Nitrogen oxide-removing catalyst 2 was analyzed by an ICP emission analysis, whereby the amount of Pt supported, was 1.7 wt %.

10 g of adsorbent 1 which was calcined in air at 500° C. for 1 hour, and 10 g of nitrogen oxide-removing catalyst 2 were thoroughly physically mixed in a mortar and press-molded under a pressure of 400 kg/cm². The press-molded product was pulverized to adjust the particle size to from 12 to 20 mesh to obtain exhaust gas-purifying catalyst 5.

EXAMPLE 15

Preparation of Exhaust Gas-purifying Catalyst 6

5 g of adsorbent 4 which was calcined in air at 500° C. for 1 hour, and 5 g of nitrogen oxide-removing catalyst 2 were thoroughly physically mixed in a mortar and 2 press-molded under a pressure of 400 kg/cm². The press-molded product was pulverized to adjust the particle size to from 12 to 20 mesh to obtain exhaust gas-purifying catalyst 6.

Comparative Example 21

Preparation of Comparative Catalyst 1

Nitrogen oxide-removing catalyst 1 was press-molded alone under a pressure of 400 kg/cm². The press-molded product was pulverized to adjust the particle size to from 12 to 20 mesh and subjected to a catalytic activity test as comparative catalyst 1.

Comparative Example 22

Preparation of Comparative Catalyst 2

Nitrogen oxide-removing catalyst 2 was press-molded alone under a pressure of 400 kg/cm². The press-molded product was pulverized to adjust the particle size to from 12 to 20 mesh and subjected to a catalytic activity test as comparative catalyst 2.

Comparative Example 23

Preparation of Comparative Catalyst 3

Adsorbent 1 which was calcined in air at 500° C. for 1 hour, was press-molded alone under a pressure of 400 kg/cm². The press-molded product was pulverized to adjust the particle size to from 12 to 20 mesh and subjected to a catalytic activity test as comparative catalyst 3.

Comparative Example 24

Preparation of Comparative Catalyst 4

Adsorbent 4 which was calcined in air at 500° C. for 1 hour, was press-molded alone under a pressure of 400 kg/cm². The press-molded product was pulverized to adjust the particle size to from 12 to 20 mesh and subjected to a catalytic activity test as comparative catalyst 4.

Comparative Example 25

Preparation of Comparative Catalyst 5

An ammonium-type ZSM-5 was prepared in the same manner as in Example 1 except that 40 g of a zeolite having a ZSM-5 structure, manufactured by TOSOH CORPORATION (tradename: HSZ-820NAA) and having a $SiO_2/Al_2O_3$ molar ratio of 24, was used. 5 g of the ZSM-5 which was calcined in air at 500° C. for 1 hour, and 5 g of nitrogen oxide-removing catalyst 1 were thoroughly uniformly physically mixed in a mortar and press-molded under a pressure of 400 kg/cm². The press-molded product was pulverized to adjust the particle size to from 12 to 20 mesh and subjected to a catalytic activity test as comparative catalyst 5.

Comparative Example 26

Preparation of Comparative Catalyst 6

An ammonium-type mordenite was prepared in the same manner as in Example 1 except that 40 g of mordenite manufactured by TOSOH CORPORATION (tradename: HSZ-690HOA) and having a $SiO_2/Al_2O_3$ molar ratio of 224, was used. 5 g of this mordenite which was calcined in air at 500° C. for 1 hour and 5 g of nitrogen oxide-removing catalyst 1 were thoroughly uniformly physically mixed in a mortar and press-molded under a pressure of 400 kg/cm². The press-molded product was pulverized to adjust the particle size to from 12 to 20 mesh and subjected to an activity test as comparative catalyst 6.

Test on Catalytic Activity 2 cc of each of exhaust gas-purifying catalysts 1 to 6 and comparative catalysts 1 to 6, was packed into an atmospheric pressure fixed bed flow reactor, and the catalytic activity was evaluated. As pretreatment before the reaction, each catalyst was heated to 550° C. and maintained for 30 minutes, while flowing a model exhaust gas as shown in Table 5 at a flow rate of 4,000 cc/min, then cooled to 100° C. under flowing of the model gas and maintained at 100° C. for 1 hour. Then, temperature of the catalyst was constantly raised at a temperature raising rate of 10° C./min under flowing of a model gas as identified in Table 5, whereby the gas at the outlet of the catalyst was continuously analyzed to examine the activity for removal of $NO_x$. The space velocity (based on the volume) at that time was 120,000 $hr^{-1}$. The conversion efficiency of $NO_x$ is represented by the following formula, and the $NO_x$ removal activity of each catalyst is shown in Table 6.

$$NO_x \text{ conversion efficiency} = \{([NO_x]_{in} - [NO_x]_{out})/[NO_x]_{in}\} \times 100$$

wherein $[NO_x]_{in}$: $NO_x$ concentration in the inlet gas; and $[NO_x]_{out}$: $NO_x$ concentration in the outlet gas.

TABLE 5

| Components | Concentrations |
| --- | --- |
| NO | 200 ppm |
| n-$C_{10}H_{22}$ | 1000 ppm (calculated as $C_1$) |
| $C_2H_4$ | 200 ppm (calculated as $C_1$) |
| $O_2$ | 10 vol % |
| $H_2O$ | 7 vol % |
| $SO_2$ | 25 ppm |
| $N_2$ | Balance |

TABLE 6

| | $NO_x$ conversion efficiency (%) | | |
| --- | --- | --- | --- |
| | 225° C. | 250° C. | 300° C. |
| Exhaust gas purifying catalyst 1 | 37 | 20 | 11 |
| Exhaust gas purifying catalyst 2 | 41 | 23 | 10 |
| Exhaust gas purifying catalyst 3 | 39 | 19 | 9 |
| Exhaust gas purifying catalyst 4 | 40 | 21 | 13 |
| Exhaust gas purifying catalyst 5 | 44 | 20 | 10 |
| Exhaust gas purifying catalyst 6 | 46 | 22 | 8 |
| Comparative catalyst 1 | 31 | 17 | 5 |
| Comparative catalyst 2 | 39 | 19 | 3 |
| Comparative catalyst 3 | 1 | 1 | 3 |
| Comparative catalyst 4 | 1 | 1 | 2 |
| Comparative catalyst 5 | 31 | 12 | 5 |
| Comparative catalyst 6 | 29 | 14 | 3 |

Test on Durability of Catalyst 2 cc of each of exhaust gas-purifying catalysts 1 to 6 and comparative catalysts 1 to 6, was packed into an atmospheric pressure fixed bed flow reactor made of quartz glass and subjected to a durability test. The durability test was carried out by treating each catalyst at 600° C. for 50 hours while flowing to each catalyst a mixed gas having $H_2O$ and $SO_2$ incorporated to air gas in volume amounts of 10 vol % and 25 ppm, respectively, at a flow rate of 200 cc/min.

With respect to each catalyst subjected to the durability treatment, the $NO_x$ conversion efficiency was examined by the same pretreatment and evaluation conditions as in "Test on catalytic activity". The $NO_x$ conversion efficiency of each catalyst after the durability test is shown in Table 7.

TABLE 7

| | $NO_x$ conversion efficiency (%) | | |
| --- | --- | --- | --- |
| | 225° C. | 250° C. | 300° C. |
| Exhaust gas purifying catalyst 1 | 37 | 21 | 10 |
| Exhaust gas purifying catalyst 2 | 42 | 22 | 10 |
| Exhaust gas purifying catalyst 3 | 41 | 20 | 10 |
| Exhaust gas purifying catalyst 4 | 39 | 19 | 11 |
| Exhaust gas purifying catalyst 5 | 44 | 21 | 9 |
| Exhaust gas purifying catalyst 6 | 45 | 23 | 10 |
| Comparative catalyst 1 | 30 | 19 | 6 |
| Comparative catalyst 2 | 38 | 22 | 3 |
| Comparative catalyst 3 | 0 | 0 | 1 |
| Comparative catalyst 4 | 0 | 1 | 1 |
| Comparative catalyst 5 | 27 | 11 | 5 |
| Comparative catalyst 6 | 25 | 15 | 4 |

The adsorbents for ethylene according to the present invention are capable of adsorbing large amounts of a hydrocarbon, particularly ethylene, and they are excellent in the adsorption characteristics. Further, with the adsorbents of the present invention, no decrease in the amounts adsorbed is observed by durability treatment, thus indicating that the performance of adsorption and removal of ethylene is maintained even after the adsorbents are exposed to high temperatures. However, from Tables 6 and 7, it is evident that with the adsorbents only, the catalytic activity for removal of nitrogen oxide from an oxide-excessive exhaust gas containing the nitrogen oxide and a hydrocarbon, is low, and its catalytic performance is low. On the other hand, a conventional nitrogen oxide-removing catalyst exhibits an activity for removal of nitrogen oxide from an oxygen excessive exhaust gas, but the performance for the removal of nitrogen oxide is not fully satisfactory.

Whereas, with exhaust gas-purifying catalysts of the present invention, the activities for removal of nitrogen oxide from an oxygen excessive exhaust gas containing the nitrogen oxide and a hydrocarbon such as ethylene, are improved over comparative catalysts. As compared with a case where the adsorbent for ethylene of the present invention, or the nitrogen oxide-removing catalyst, is used alone, an exhaust gas-purifying catalyst of the present invention prepared by a combination of the two, provides a higher removal activity of nitrogen oxide. Accordingly, it is considered that with the exhaust gas-purifying catalyst of the present invention, a hydrocarbon such as ethylene adsorbed on the adsorbent for ethylene in a low temperature range is participated in the reaction for removal of nitrogen oxide, and further that in the reaction for removal of nitrogen oxide, the hydrocarbon adsorbed is more effectively utilized as compared with a conventional composite catalyst. Further, with the adsorbent for ethylene of the present invention, no decrease is observed in the ability of adsorbing a hydrocarbon such as ethylene, even after it is exposed to a high temperature. Accordingly, even after the durability treatment, the combined effect of the ability to absorb a hydrocarbon such as ethylene and the nitrogen oxide-removing catalyst, will be maintained.

The adsorbent for ethylene of the present invention is capable of efficiency adsorbing and removing ethylene in a gas phase, and its performance for adsorbing a hydrocarbon does not decrease even after the adsorbent is exposed at a high temperature. Further, the adsorbent of the present invention has a high performance to keep ethylene as adsorbed. Accordingly, ethylene can efficiency be removed by contacting the adsorbent of the present invention with a gas phase containing ethylene. By utilizing this nature, it is possible to efficiency adsorb and remove ethylene discharged during the start up of an engine of e.g. an automobile and to hold it as adsorbed to a temperature at which an exhaust gas-purifying catalyst will operate, by the adsorbent of the present invention.

Further, the adsorbent of the present invention can be used also for adsorption and removal of ethylene formed from the crops.

By using an exhaust gas-purifying catalyst of the present invention, a hydrocarbon discharged at a low temperature at the time of e.g. the start up of an engine, can efficiency be adsorbed and removed. Further, in a temperature range at which a nitrogen oxide-removing catalyst component acts as a catalyst, not only the conventional catalytic performance is obtainable, but also a hydrocarbon such as ethylene adsorbed on the adsorbent can be utilized at high efficiency, whereby the removal activity of nitrogen oxide is substantially improved. Further, with the exhaust gas-purifying catalyst of the present invention, the performance for removal of nitrogen oxide will not decrease even after it is exposed at a high temperature. Namely, it is possible to efficiently remove nitrogen oxide by contacting the exhaust gas-purifying catalyst of the present invention with an exhaust gas containing the nitrogen oxide and a hydrocarbon such as ethylene.

What is claimed is:

1. A method for adsorbing and removing ethylene in a gas, which comprises contacting an adsorbent consisting essentially of a zeolite which contains Ag and Pd and which has a ferrierite structure with a $SiO_2/Al_2O_3$ molar ratio being from 21 to 1,000, said adsorbent adsorbing at least about $18.8 \times 10^{-5}$ mol/g ethylene and the desorbing peak temperature for ethylene being at least about 330° C., with said gas.

* * * * *

UNITED STATES PATENT AND TRADEMARK OFFICE
CERTIFICATE OF CORRECTION

PATENT NO. : 6,309,616 B1
DATED : October 30, 2001
INVENTOR(S) : Ogawa et al.

It is certified that error appears in the above-identified patent and that said Letters Patent is hereby corrected as shown below:

<u>Title page,</u>
Item [30], the Foreign Application Priority information should read:

| [30] | Foreign Application Priority Data | |
|---|---|---|
| Jul. 2, 1997 | (JP) | 9-177306 |
| Jul. 2, 1997 | (JP) | 9-177309 |
| Nov. 26, 1997 | (JP) | 9-324279 |

Signed and Sealed this

Twelfth Day of March, 2002

Attest:

*Attesting Officer*

JAMES E. ROGAN
*Director of the United States Patent and Trademark Office*